US008445847B2

(12) United States Patent
Furukawa et al.

(10) Patent No.: US 8,445,847 B2
(45) Date of Patent: May 21, 2013

(54) ABNORMAL MEASUREMENT DETECTION DEVICE AND METHOD FOR INFRARED RADIATION THERMOMETER

(75) Inventors: Yuichi Furukawa, Toyota (JP); Shingo Nakamura, Toyota (JP); Yuji Okada, Toyota (JP); Fumio Kawahara, Toyota (JP)

(73) Assignees: Toyota Jidosha Kabushiki Kaisha, Toyota-shi (JP); MEIWA e-TEC co., ltd., Toyota-shi (JP)

( * ) Notice: Subject to any disclaimer, the term of this patent is extended or adjusted under 35 U.S.C. 154(b) by 810 days.

(21) Appl. No.: 12/593,541

(22) PCT Filed: Mar. 25, 2008

(86) PCT No.: PCT/JP2008/056283
§ 371 (c)(1),
(2), (4) Date: Sep. 28, 2009

(87) PCT Pub. No.: WO2008/123487
PCT Pub. Date: Oct. 16, 2008

(65) Prior Publication Data
US 2010/0073670 A1    Mar. 25, 2010

(30) Foreign Application Priority Data

Mar. 30, 2007 (JP) ................................. 2007-094131

(51) Int. Cl.
*G01J 5/00*    (2006.01)
(52) U.S. Cl.
USPC ....................................................... 250/338.1
(58) Field of Classification Search
USPC ............. 250/252.1, 559.41; 356/237.9, 237.5
See application file for complete search history.

(56) References Cited

FOREIGN PATENT DOCUMENTS

| CN | 1032979 A | 5/1989 |
|---|---|---|
| JP | 59-160723 A | 9/1984 |
| JP | 04-091919 A | 3/1992 |

(Continued)

OTHER PUBLICATIONS

Machine Translation JP 09-264794.*

(Continued)

*Primary Examiner* — David Porta
*Assistant Examiner* — Hugh H Maupin
(74) *Attorney, Agent, or Firm* — Kenyon & Kenyon LLP

(57) ABSTRACT

A technique for an infrared radiation thermometer used for thermography detects measurement abnormality of the infrared radiation thermometer and estimates the causes of the measurement abnormality such as contamination of an objective lens and a malfunction in a mechanism section of the infrared radiation thermometer. The measurement abnormality detector has a dummy lens 21 placed in the periphery of the objective lens 11 of the thermometer 10 so as to be at a position and in an attitude that are more susceptible to contamination than the objective lens 11, a laser displacement meter 22 for projecting light to the dummy lens 21 at each predetermined time or at a predetermined timing, receiving the light reflected by the dummy lens 21, and measuring the quantity of the received light, and determination means 50 for calculating the attenuation rate of the projected light on the basis of the quantity of the received light measured by the laser displacement meter 22, estimating the degree of contamination of the dummy lens 21 on the basis of the calculated attenuation rate, and judging, on the basis of the degree of contamination of the dummy lens 21, the necessity of warning for contamination of the objective lens 11 and measurement abnormality of the thermometer 10.

4 Claims, 4 Drawing Sheets

FOREIGN PATENT DOCUMENTS

| | | |
|---|---|---|
| JP | 5-133816 A | 5/1993 |
| JP | 06-174553 A | 6/1994 |
| JP | 7-333072 A | 12/1995 |
| JP | 09-210795 A | 8/1997 |
| JP | 09-264794 A | 10/1997 |
| JP | 3041996 U | 10/1997 |
| JP | 2000-046656 A | 2/2000 |
| JP | 2001-318003 A | 11/2001 |
| JP | 2002-090224 A | 3/2002 |
| JP | 2003-130366 A | 5/2003 |
| JP | 2003-296849 A | 10/2003 |

OTHER PUBLICATIONS

Machine Translation JP 2002-090224.*
Machine Translation JP 2000-046656.*
Machine Translation JP 2003-296849.*

* cited by examiner

ABNORMAL MEASUREMENT DETECTION DEVICE AND METHOD FOR INFRARED RADIATION THERMOMETER

This is a 371 national phase application of PCT/JP2008/056283 filed 25 Mar. 2008, claiming priority to Japanese Patent Application No. 2007-094131 filed 30 Mar. 2007, the contents of which are incorporated herein by reference.

TECHNICAL FIELD

The present invention relates to an art preventing measurement abnormality of an infrared radiation thermometer previously and detecting the measurement abnormality with regard to temperature measurement with the infrared radiation thermometer.

BACKGROUND ART

Conventionally, in various fields such as engineering and medical science, thermography is used to measure surface temperature of a measurement object noncontactingly. The thermography shows temperature distribution of a surface of an object or an organism as an image, and temperature detected by an infrared radiation thermometer is grasped as a change of electrical characteristics and is re-converted into strength of light and outputted as an image, whereby continuous temperature distribution of the surface of the measurement object can be observed.

For example, in the infrared radiation thermometer, (1) infrared radiation from a measurement object is condensed through a lens and focalized at a detecting element, (2) an electric signal corresponding to the strength of the infrared radiation is obtained from the detecting element, and (3) the signal is amplified, linearizedly revised and emissively revised by, and then displayed and outputted.

Such thermography is also used in the field of casting so as to measure temperature of a cavity of a casting mold.

Explanation will be given on an example of the casting processes referring FIG. 1. For example, the casting processes are performed in steps S1 to S4 shown in FIG. 1. A mold 30 is clamped (step S1), melted metal is injected into a cavity 33 so as to form a product (step S2), the mold is opened and the product is taken out from the mold 30 (step S3), the cavity 33 is splayed thereto with release agent and then dried by air blow (step S4), and then the mold 30 is clamped again (step S1) and the casting processes are shifted to the next cycle.

In the above casting processes, at the time of opening the casting mold, temperature of the cavity is measured with an infrared radiation thermometer 10. However, at the time of opening the casting mold, smoke, oil mist, the release agent and the like are scattered, whereby an objective lens 11 of the thermometer 10 is adhered thereto with oil, dust and the like and is contaminated. Accordingly, dirt is accumulated on the objective lens 11 of the thermometer 10 so as to cause measurement abnormality. Then, it is necessary to clean the surface of the objective lens 11 timely. For preventing contamination of a lens of an infrared radiation thermometer, the JP-U-3041996 discloses an art of an infrared radiation thermometer that a protection filter is detachably attached at a position before an objective lens so as to prevent adhesion of oil, dust and the like to the objective lens and to perform check of contamination and cleaning work quickly.

However, in the casting, at the time of measuring the temperature of the cavity of the casting mold, the objective lens of the infrared radiation thermometer may be positioned at a position difficult to be viewed by an operator, such as a position above the casting mold or a position with high temperature. In this case, it is difficult to judge whether the measurement abnormality is caused by the contamination of the objective lens actually or not. For preventing the measurement abnormality caused by the contamination of the objective lens, the surface of the objective lens may be cleaned usually, but it is not productive.

The present invention proposes an art of the infrared radiation thermometer used for thermography that measurement abnormality is detected and the cause of the measurement abnormality, such as contamination of the objective lens, defect of the mechanical part of the infrared radiation thermometer or the like, is estimated.

DISCLOSURE OF THE INVENTION

An measurement abnormality detection device for an infrared radiation thermometer, which is the first aspect of the present invention, includes a dummy lens, received light quantity measurement means and a determination means. The dummy lens is placed around an objective lens of the infrared radiation thermometer and arranged at a position and in an attitude that are more susceptible to contamination than the objective lens. The received light quantity measurement means for projecting light to the dummy lens at predetermined intervals or at a predetermined timing, for receiving the light reflected by the dummy lens, and for measuring received light quantity. The determination means calculate an attenuation rate of the projected light on the basis of the received light quantity measured by the received light quantity measurement means, estimates degree of contamination of the dummy lens on the basis of the calculated attenuation rate, and judges necessity of warning for contamination of the objective lens on the basis of the degree of contamination of the dummy lens.

An measurement abnormality detection device for an infrared radiation thermometer, which is the second aspect of the present invention, provided with a dummy lens, a received light quantity measurement means and a determination means. The dummy lens is placed around an objective lens of the infrared radiation thermometer so as to be at a position and in an attitude that are more susceptible to contamination than the objective lens. The determination means is connected to the received light quantity measurement means. The method includes a step that the received light quantity measurement means projects light to the dummy lens at predetermined intervals or at a predetermined timing, receives the light reflected by the dummy lens, and measures received light quantity, and a step that the determination means calculates attenuation rate of the projected light on the basis of the measured received light quantity, estimates degree of contamination of the dummy lens on the basis of the calculated attenuation rate, and judges, on the basis of the degree of contamination of the dummy lens, the necessity of warning for contamination of the objective lens.

An measurement abnormality detection device for an infrared radiation thermometer, which is the third aspect of the present invention, comprises a thermoelectric thermometer and a determination means. The thermoelectric thermometer measures temperature of a dummy black body point set at a part which can be regarded as a black body in a measurement object of the infrared radiation thermometer. The determination means obtains temperatures of the dummy black body point measured by the thermoelectric thermometer and by the infrared radiation thermometer, detects measurement abnormality on the basis of difference between these measured temperatures, and, when the measurement abnormality is detected, judges whether a defect exists in the infrared radiation thermometer or the thermoelectric thermometer on the basis of relation between the temperatures measured by the thermoelectric thermometer and by the infrared radiation thermometer.

An measurement abnormality detection device for an infrared radiation thermometer, which is the forth aspect of the present invention, provided with a thermoelectric thermometer and a determination means. The thermoelectric thermometer measures temperature of a dummy black body point set at a part which can be regarded as a black body in a measurement object of the infrared radiation thermometer. The determination means is connected to the infrared radiation thermometer and the thermoelectric thermometer. The method includes a step that temperature of the dummy black body point is measured by the infrared radiation thermometer and the thermoelectric thermometer, and a step that the determination means obtains the temperature measured by the thermoelectric thermometer and the temperature measured by the infrared radiation thermometer, detecting measurement abnormality on the basis of difference between these measured temperatures, and, when the measurement abnormality is detected, judges whether a defect exists in the infrared radiation thermometer or the thermoelectric thermometer on the basis of relation between the temperatures measured by the thermoelectric thermometer and by the infrared radiation thermometer.

THE BEST MODE FOR CARRYING OUT THE INVENTION

Figure 2:
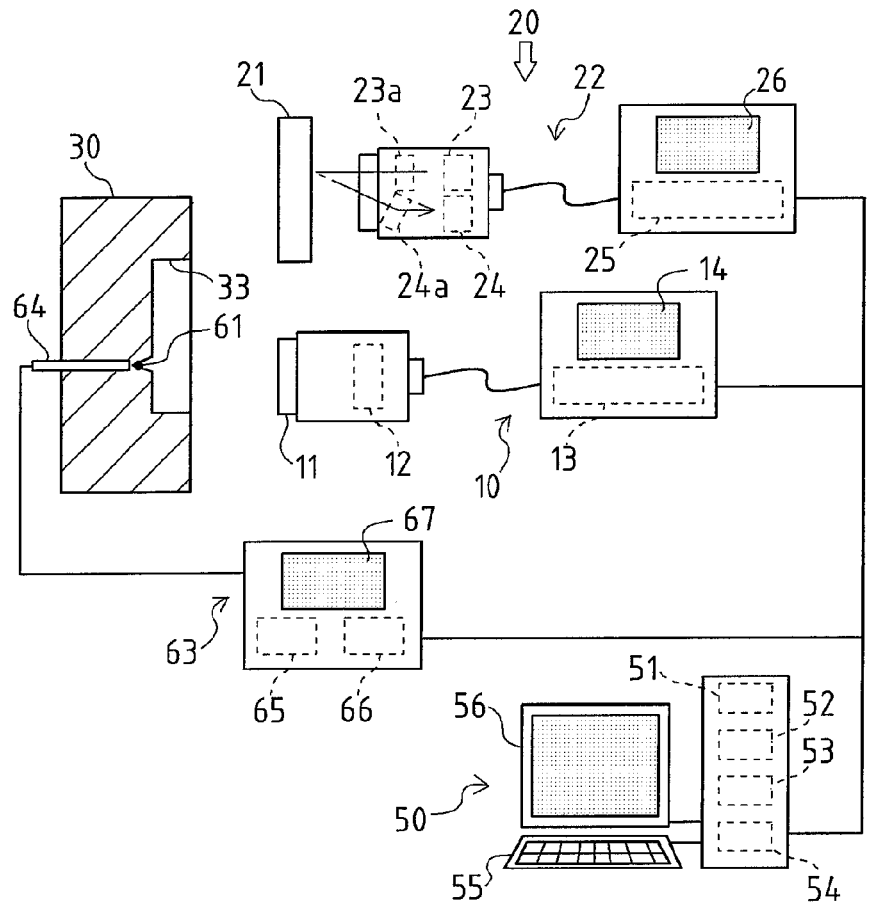
FIG. 2 is a drawing of an infrared radiation thermometer according to the present invention and devices provided therewith.

As shown in FIG. 2, an infrared radiation thermometer 10, which is an embodiment of an infrared radiation thermometer according to the present invention, measures surface temperature of a cavity 33 of a mold 30. The thermometer 10 is provided therein with an measurement abnormality detection device, the device containing a lens contamination detection mechanism 20 for detecting contamination of a lens, a thermoelectric thermometer 63 for measuring temperature of the mold 30, which is a measurement object of the thermometer 10, and a determination means 50 electrically connected to the thermometer 10, the lens contamination detection mechanism 20 and the thermometer 63.

According to the measurement abnormality detection device, when contamination of an objective lens 11 of the thermometer 10 is notified or measurement abnormality occurs, it is specified whether the defect is caused by the thermometer 10 or the measurement abnormality detection device.

In this embodiment, the infrared radiation thermometer 10 and the measurement abnormality detection device are provided with the mold 30. However, the application is not limited thereto, and for example the devices may alternatively be provided with a pressing machine so as to measure temperature of a pressed product.

Explanation will be given on the mold 30 with which the thermometer 10 and the measurement abnormality detection device are provided.

Figure 3:
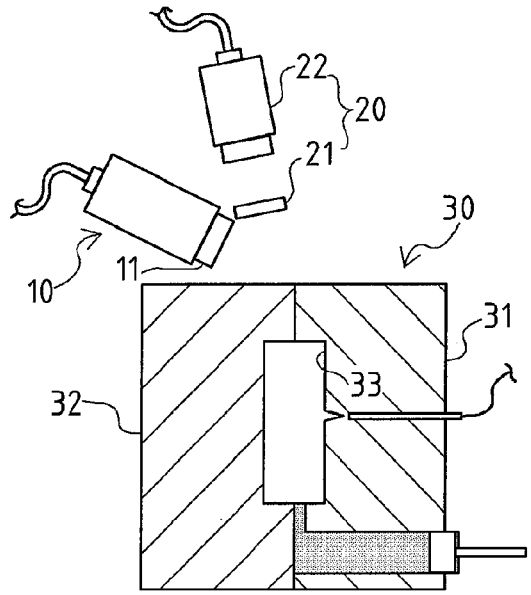
FIG. 3 is a drawing of an embodiment of a lens contamination detection mechanism and a thermoelectric thermometer according to the present invention.
Figure 4:
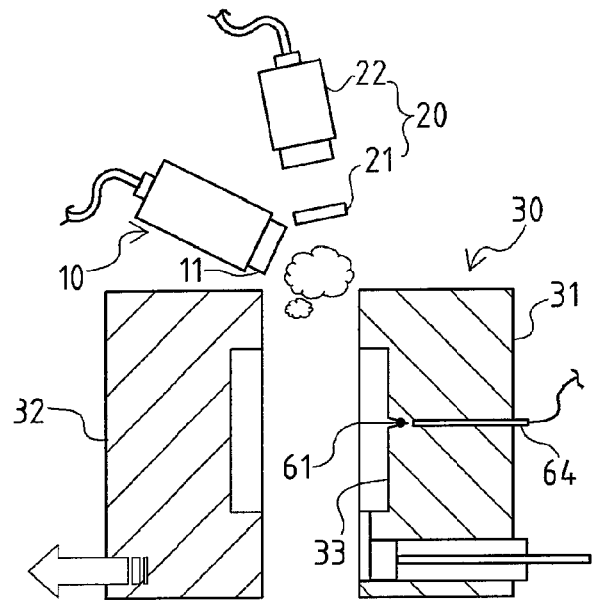
FIG. 4 is a drawing of the embodiment of the lens contamination detection mechanism and the thermoelectric thermometer according to the present invention.

As shown in FIGS. 3 and 4, the mold 30 has a fixed mold 31, a movable mold 32 which can be moved close to or apart from the fixed mold 31, and the like. When the mold 30 is clamped (the fixed mold 31 is mated closely with the movable mold 32), the cavity 33 in which a casting is molded is formed in a mating surface between the fixed mold 31 and the movable mold 32.

The reflectance of the surface of the cavity 33 is preferably small. Then, for reducing the reflectance of the surface of the cavity 33, for example carbon fullerene which is a black substance may be applied thereto. The carbon fullerene is known not to affect the mold 30 and the castings. The carbon fullerene hardly peels off from the mold 30 at the time of casting and is easily applied again if the carbon fullerene peels off. Accordingly, the carbon fullerene is suitable as a black substance to be applied to the cavity 33.

By applying a thing with low reflectance to the cavity 33 as mentioned above, measurement accuracy is improved in the case of measurement of temperature of the mold 30 with the thermometer 10. That is because the high reflectance of the cavity 33 of the new mold 30, which is lustrous silver, can be reduced by applying the black substance, and color shading, which occurs on the cavity 33 of the mold 30 according to use status, can be reduced by applying the black substance, whereby the surface status of the cavity 33 is substantially fixed regardless of newness or oldness and use status of the mold 30.

By applying the black substance to the cavity 33, seizure of the mold 30 can be reduced.

Explanation will be given on the construction of the thermometer 10.

The thermometer 10 is provided so as to measure the surface temperature of the cavity 33 of the new mold 30 noncontactingly and nondestructively.

As shown in FIGS. 2 to 4, the thermometer 10 has the objective lens 11, a detecting element 12, an operation part 13 and an output part 14. The objective lens 11 of the thermometer 10 is arranged at the position at which the cavity 33, exposed on the mating surface between the fixed mold 31 and the movable mold 32 in the state that the mold 30 is opened (the fixed mold 31 and the movable mold 32 are separated), can be imaged.

With regard to the thermometer 10, infrared radiation radiated from a measurement object is condensed by the objective lens 11, focalized at the detecting element 12, and exchanged to an electric signal corresponding to the magnitude of the infrared radiation by the detecting element 12. The electric signal is amplified, linearizedly revised and emissively revised by the operation part 13, and then displayed and outputted by the output part 14.

However, the construction of the thermometer 10 is not limited to the above-mentioned construction, and a commonly obtainable infrared radiation thermometer may be used.

Explanation will be given on the lens contamination detection mechanism 20.

In the measurement abnormality detection device, as the lens contamination detection mechanism 20 detecting degree of contamination of the objective lens 11 of the thermometer 10, a dummy lens 21 and a laser displacement meter 22 are provided.

As shown in FIGS. 2 to 4, the dummy lens 21 is placed in the periphery of the objective lens 11 of the thermometer 10 so as to be arranged at a position and in an attitude those are more susceptible to contamination than the objective lens 11. In detail, the dummy lens 21 is placed at a position and in an attitude those are close to the objective lens 11 of the thermometer 10 and more susceptible to be adhered thereto by gas, scattering thing and the like emitted from the cavity 33 of the new mold 30 so as to be not less susceptible to contamination than the objective lens 11.

As the dummy lens 21, a member is adopted which is translucent, is hardly scared, and is not heat-distorted and reacted by gas, scattering thing and the like emitted from the cavity 33 of the new mold 30 (for example, a glass lens).

Then, the laser displacement meter 22 is provided at a position far from the dummy lens 21 for predetermined distance. As the laser displacement meter 22, a commonly obtainable laser displacement meter can be used. The distance between the dummy lens 21 and the laser displacement meter 22 is preferable short so as to improve the accuracy.

The laser displacement meter 22 is adopted to the lens contamination detection mechanism 20 as an embodiment of a received light quantity measurement means which projects light to the dummy lens 21 at each predetermined time or at a predetermined timing, receives the light reflected by the dummy lens 21, and measures the received light quantity (intensity).

Then, instead of the laser displacement meter 22, any member can be adopted which can project light to the dummy lens 21 and detect quantity of light reflected by the dummy lens 21. For example, an illuminant and a luminance meter may be provided so that the illuminant projects light to the dummy lens 21 and the luminance meter measures quantity of light reflected by the dummy lens 21.

Figure 5:
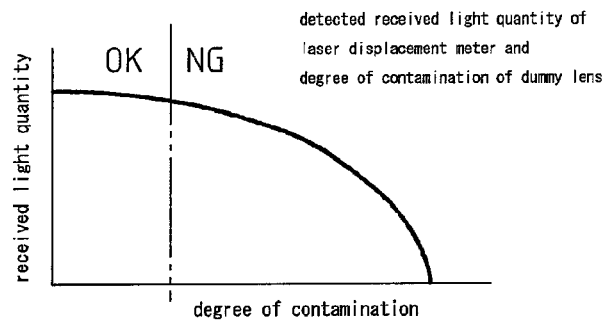
FIG. 5 is a diagram of relation between received light quantity and degree of contamination of a dummy lens.

Since the dummy lens 21 is translucent, a part of light projected to the dummy lens 21 is transilluminated, another part thereof is absorbed, and the other part thereof is reflected. As shown in FIG. 5, there is known that the larger the degree of contamination of the dummy lens 21 is, the small the received light quantity detected by the laser displacement meter 22 is. Then, the laser displacement meter 22 is provided so as not to measure the displacement from the laser displacement meter 22 to the dummy lens 21 but to measure the degree of contamination of the dummy lens 21 on the basis of the change of the received light quantity detected by the laser displacement meter 22 (attenuation quantity) in the state that the distance between the dummy lens 21 and the laser displacement meter 22 is substantially fixed. In the lens contamination detection mechanism 20, on the basis of the degree of contamination of the dummy lens 21, the degree of contamination of the objective lens 11 of the thermometer 10 is estimated.

The laser displacement meter 22 has a luminous element 23, a photo detection element 24, an operation part 25 and an output part 26. Laser light projected from the luminous element 23 is condensed through a floodlight lens 23a and is irradiated to the dummy lens 21. A part of the light diffusively reflected by the dummy lens 21 is detected by the photo detection element 24 through a photo detection lens 24a. The received light quantity (light intensity) detected by the photo detection element 24 is calculated by the operation part 25, displayed and outputted by the output part 26 and transmitted to the determination means 50 discussed later.

With regard to the lens contamination detection mechanism 20, the object of contamination detection is not the objective lens 11 of the thermometer 10 but the dummy lens 21. Accordingly, when the thermometer 10 is exchanged with another device, the lens contamination detection mechanism 20 can be used continuously. Maintenance of the thermometer 10 because of the lens contamination or the like may be performed as an outside order by a specialist. Then, the construction that the lens contamination detection mechanism 20 is independent of the thermometer 10 is suitable on the point that casting can be continued only by exchanging the thermometer 10.

Explanation will be given on the thermometer 63 which is an embodiment of the thermoelectric thermometer according to the present invention.

As shown in FIGS. 2 to 4, the thermoelectric thermometer 63 measuring the temperature of the mold 30 is provided in the measurement abnormality detection device so as to detect the measurement abnormality of the thermometer 10. Both the thermometers 63 and 10 measure temperature of a dummy black body point 61 set at a part which can be regarded as a black body in the mold 30 being the measurement object of the infrared radiation thermometer 10.

The dummy black body point 61 is set in or near the cavity 33 of the mold 30 at a part having shape absorbing infrared radiation (preferably, cone shape) or a part the most close to the black body of the cavity 33 being the measurement object in the shape characteristics. Accordingly, the dummy black body point 61 is provided in or near the cavity 33 of the mold 30 being the measurement object of the thermometer 10, whereby the measurement abnormality of the thermometer 10 can be detected accurately.

In this embodiment, a cone hole 62 is provided in or near the cavity 33 of the mold 30, and the bottom of the hole 62 is regarded as the dummy black body point 61. The dummy black body point 61 can be provided in the mold 30 by using a cone hole existing in the inner peripheral shape of the cavity 33 or by forming a cone hole newly near the cavity 33.

In addition, when the dummy black body point 61 is difficult to be provided in the mold 30, it may alternatively be constructed that a jig holding a thermocouple 64 of the thermometer 63 and the dummy black body point 61 is set in the jig.

The thermometer 63 has the thermocouple 64, a detection part 65, an operation part 66 and an output part 67. Electromotive force generated in the thermocouple 64 is detected by the detection part 65. The temperature is calculated by the operation part 66 on the basis of the detected electromotive force, and is displayed and outputted by the output part 67 and transmitted to the determination means 50 discussed later.

The thermometer 63 is provided so as to measure the temperature of the dummy black body point 61. However, it is difficult to measure the temperature of the dummy black body point 61 itself actually. Then, the thermocouple 64 is arranged near the dummy black body point 61, and the thermometer 63 measures temperature more close to the temperature of the dummy black body point 61 of the mold 30.

Explanation will be given on the construction of the determination means 50 which is an embodiment of the determination means according to the present invention.

As shown in FIG. 2, the thermometer 10 and the lens contamination detection mechanism 20 are connected to the determination means 50 so as to enable transmission of information. The determination means 50 obtain the information from these members so as to detect the contamination of the objective lens 11 of the thermometer 10, to judge whether the contamination of the objective lens 11 is necessary to be notified or not, and to judge the measurement abnormality of the thermometer 10.

The determination means 50 is a so-called electronic calculator. The electronic calculator has a control part 51, an operation part 52, a storage part 53, an input/output part 54, an operation input part 55 and an output part 56. These members are connected mutually through a bus for mutual exchange of information under the control of the control part 51.

The control part 51 manages the actuation control of the whole determination means 50. The operation part 52 reads out various application programs stored in the storage part 53 and executes them so as to show the function of the determination means 50. The storage part 53 stores the various application programs and data. The input/output part 54 transmits data to and receives data from an outside device for example through an optional network, and obtains information from the thermometer 10, the lens contamination detection mechanism 20 and a temperature revision device 60 and transmits signals to these members. The operation input part 55 is such as a keyboard or a mouse so as to input information to the determination means 50. The output part 56 is a display or a speaker outputting results of the processing of the determination means 50.

Figure 7:
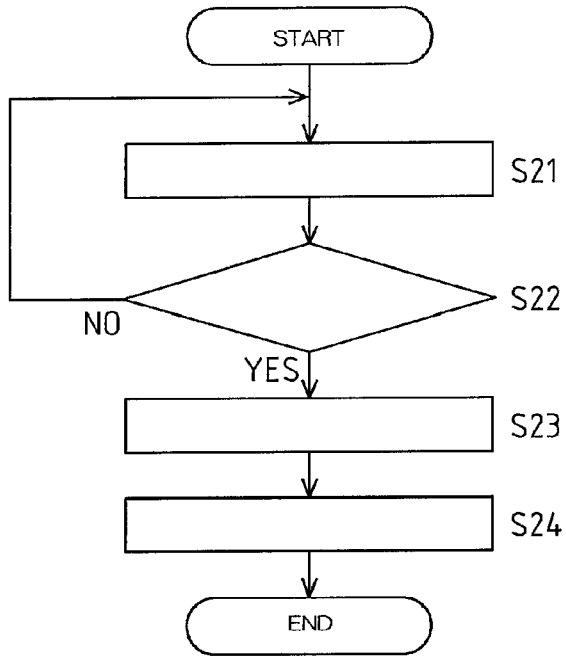
FIG. 7 is a flow chart of an embodiment of contamination detection of an objective lens by a determination means according to the present invention.

Explanation will be given on the processing of the determination means 50 obtaining measurement output value of the laser displacement meter 22 referring FIG. 7.

In the determination means 50, quantity (intensity) of light projected to the dummy lens 21 is set by the laser displacement meter 22. When the casting is started, the laser displacement meter 22 projects light to the dummy lens 21 at each predetermined time or at a predetermined timing and receives the light reflected by the dummy lens 21 so as to measure the received light quantity.

In the determination means 50, when the output value of the laser displacement meter 22 is obtained (S21), the decrement of the projected light is calculated on the basis of the output value (light quantity). Successively, in the determination means 50, the decrement is compared with a threshold set previously (S22) so as to estimate the degree of contamination of the dummy lens. The threshold is the decrement in the case that the objective lens 11 of the thermometer 10 is contaminated and accurate measurement value cannot be obtained so that the contamination of the lens must be notified, and is found experimentally and set in the determination means 50 previously.

Then, the determination means 50 judges whether the contamination of the objective lens is necessary to be notified or not on the basis of the degree of contamination of the dummy lens. Namely, when the decrement is larger than the threshold (YES at S22), the contamination of the objective lens is judged necessary to be notified (S23) and the notice is outputted through display or voice by the output part 56 (S24). It is timely to clean the objective lens 11 of the thermometer 10 at the time at which the notice is outputted. An operator may clean or exchange the objective lens 11 of the thermometer 10, or alternatively, a cleaning means such as a wiper for the objective lens 11 and the dummy lens 21 may be provided so as to clean them automatically.

As mentioned above, the dummy lens 21 is placed at the position and in the attitude that are more susceptible to contamination than the objective lens 11 of the thermometer 10 so that the dummy lens 21 is contaminated sooner than the objective lens 11 and the degree of contamination of the dummy lens 21 is larger than the objective lens 11. Therefore, the measurement abnormality of the thermometer 10 caused by the contamination of the objective lens 11 does not occur before the determination means 50 judges necessary to clean the objective lens 11 of the thermometer 10, thereby preventing the measurement abnormality previously.

In addition to the contamination of the objective lens 11 of the thermometer 10, the lens contamination detection mechanism 20 may be used for detecting disturbance factors such as sunlight so as to prevent the measurement abnormality previously.

Figure 8:
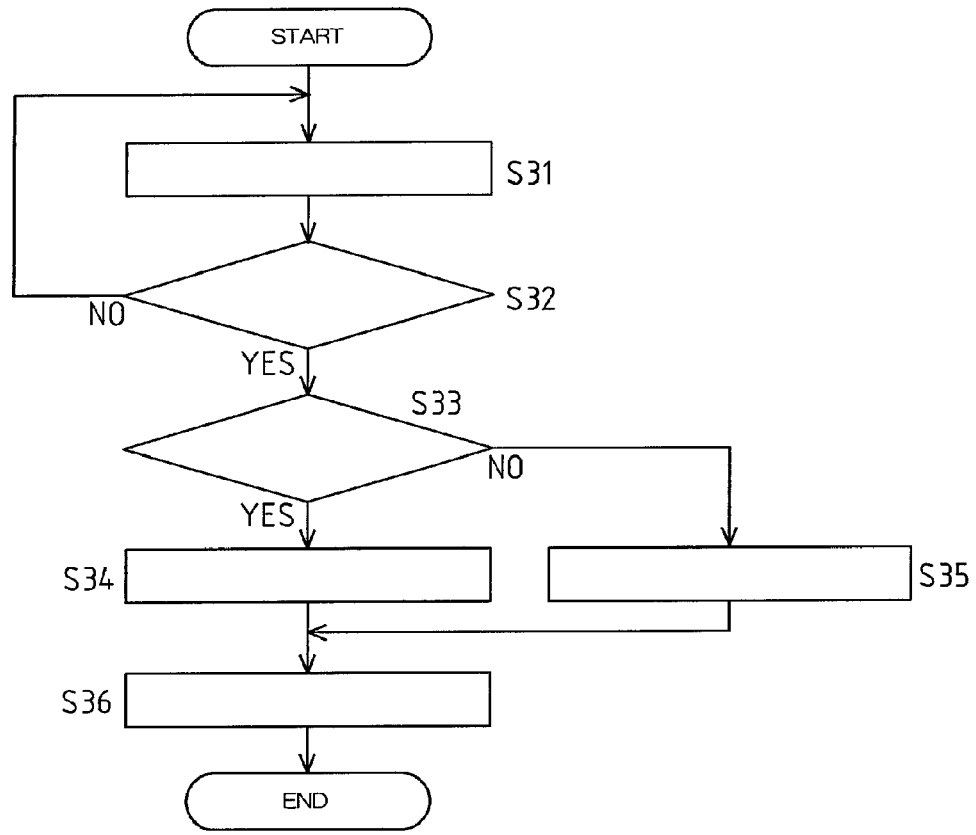
FIG. 8 is a flow chart of an embodiment of detection of measurement abnormality by the determination means according to the present invention.

Explanation will be given on the processing of the determination means 50 obtaining measured temperature of the thermometer 63 and measured temperature of the thermometer 10 referring FIG. 8.

Figure 1:
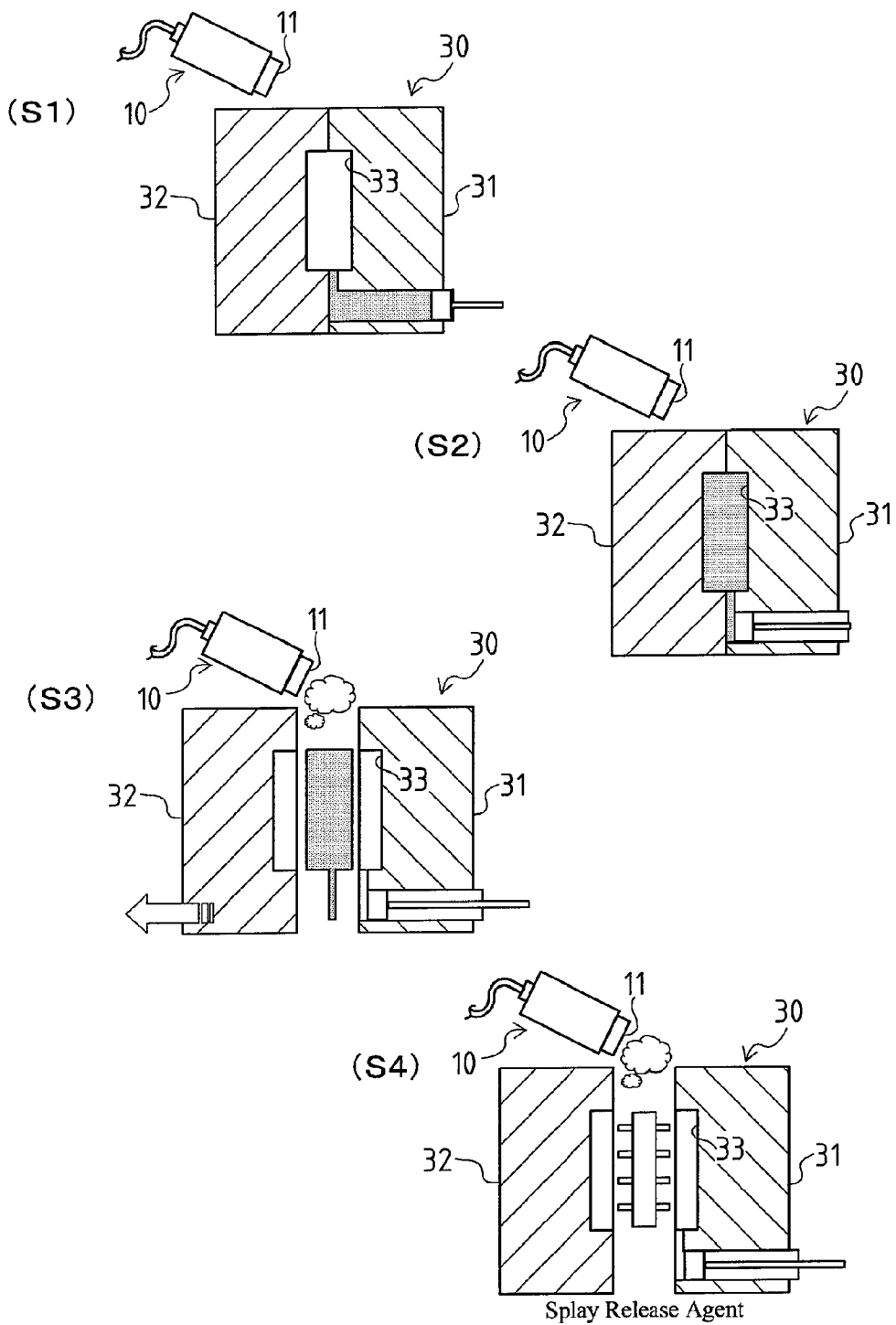
FIG. 1 is a drawing of casting processes.

With regard to the casting processes shown in FIG. 1, in the state that the mold 30 is opened (steps S3 and S4), the temperature of the dummy black body point 61 is measured by both the thermometer 10 and the thermometer 63 substantially simultaneously at each predetermined time or at a predetermined timing.

When the temperature of the dummy black body point 61 measured by the thermometer 63 and the temperature of the dummy black body point 61 measured by the thermometer 10 are obtained in the determination means 50 (S31), the determination means 50 comparatively operates these measured temperatures (S32), and the measurement abnormality is detected on the basis of the difference of the measured temperatures. When the difference of the measured temperatures of the thermometer 10 and the thermometer 63 is larger than the threshold (YES at S32), the determination means 50 judges that the measurement abnormality occurs.

When the measurement abnormality is detected, the determination means 50 judges whether the defect exists in the functional part of the thermometer 10 (the part except for the objective lens 11) or the thermometer 63 on the basis of the relation between the measured temperature of the thermometer 63 and the measured temperature of the thermometer 10.

At this time, the determination means 50 judges whether the defect exists in an NG region 1 or an NG region 2 discussed later on the basis of the tendency of the measurement abnormality, that is, the magnitude relation between the measured temperature of the thermometer 10 and the measured temperature of the thermometer 63.

Figure 6:
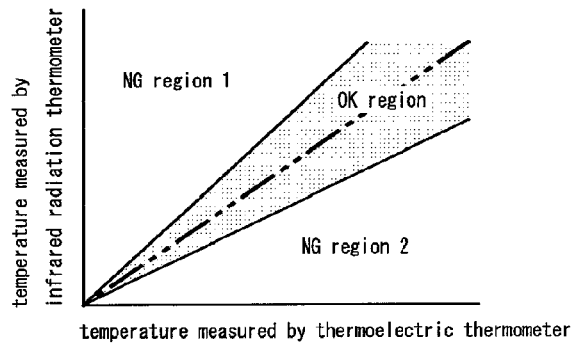
FIG. 6 is a diagram of relation between measured temperatures of the infrared radiation thermometer and the thermoelectric thermometer.

As shown in FIG. 6, concerning the relation between the measured temperature of the thermometer 10 and the measured temperature of the thermometer 63, an OK region and an NG region are set and stored in the storage part 53 of the determination means 50 previously. With regard to the NG region, the NG region in which the measured temperature of the thermometer 10 is larger than the measured temperature of the thermometer 63 is regarded as the NG region 1, and the NG region in which the measured temperature of the thermometer 10 is larger than the measured temperature of the thermometer 63 is regarded as the NG region 2.

When the tendency of the measurement abnormality exists in the NG region 1 (YES at S33), the determination means 50 judges that the abnormality exists in the functional part of the thermometer 10 (S34). As the cause of this measurement abnormality, for example, defect of the detecting element 12 or the operation part 13 of the thermometer 10 can be given.

On the other hand, when the tendency of the measurement abnormality exists in the NG region 2 (NO at S33), it is judged that the abnormality exists in the thermometer 63 (S35). As the cause of this measurement abnormality, for example, break of the thermocouple 64 can be given.

The judgment result of the determination means 50 is outputted through display or voice by the output part 56 as the notification of measurement abnormality (S36).

With regard to the measurement abnormality detection device according to this embodiment, the measured result is outputted from each of the laser displacement meter 22 and the thermometer 63 to the one determination means 50. According to this construction, the process in the case that the output is obtained from the laser displacement meter 22 and the process in the case that the output is obtained from the thermometer 10 and the thermometer 63 are performed inclusively by the determination means 50, thereby judging whether the measurement abnormality of the thermometer 10 is caused by the contamination of the objective lens 11 of the thermometer 10, the defect of the functional part of the thermometer 10, or the defect of the thermometer 63.

Namely, in the determination means 50, when the decrement of the output value obtained from the laser displacement meter 22 (received light quantity) is not larger than the predetermined threshold and the difference of measured temperatures of the thermometer 10 and the thermometer 63 is larger than the predetermined threshold, the defect of the thermometer 10 or the thermometer 63 is notified on the basis of whether the tendency of the measurement abnormality exists in the NG region 1 or the NG region 2. On the other hand, when the difference of measured temperatures of the thermometer 10 and the thermometer 63 is not larger than the predetermined threshold and the decrement of the output value obtained from the laser displacement meter 22 (received light quantity) is larger than the predetermined threshold, the contamination of the objective lens 11 of the thermometer 10 is notified.

Accordingly, the determination means 50 can detect the measurement abnormality of the infrared radiation thermometer and estimate the cause thereof, whereby the functional part or the objective lens 11 of the infrared radiation thermometer 10, the lens contamination detection mechanism 20 or the thermoelectric thermometer 63 can be maintained efficiently.

Industrial Applicability

The present invention is available of temperature measurement with an infrared radiation thermometer and is especially suitable for an art preventing measurement abnormality of the infrared radiation thermometer previously and detecting the measurement abnormality.

The invention claimed is:

1. A measurement abnormality detection device for an infrared radiation thermometer for measuring a casting mold, comprising:
   a dummy lens placed around an objective lens of the infrared radiation thermometer and arranged close to the objective lens and above the mold, the dummy lens facing more downward than the objective lens so as to be more susceptible to adherence of contaminants emitted from the mold and thus to more contamination than the objective lens;
   a laser displacement meter that projects a light to the dummy lens at predetermined intervals or at a predetermined timing, and receives the light reflected by the dummy lens, and measures a received light quantity; and
   a determination device that is programmed to calculate an attenuation rate of the projected light on the basis of the received light quantity measured by the laser displacement meter, estimate a degree of contamination of the dummy lens on the basis of the calculated attenuation rate, and judge necessity of warning for contamination of the objective lens on the basis of the degree of contamination of the dummy lens,
   wherein the dummy lens and laser displacement meter are constructed independently from the objective lens.

2. The measurement abnormality detection device according to claim 1, further comprising:
   a thermoelectric thermometer that measures temperature of a dummy black body point set in or near the mold as a part having a shape absorbing infrared radiation or a part most close in shape characteristics to a black body in the mold;
   wherein the determination device is programmed to obtain temperatures of the dummy black body point measured by the thermoelectric thermometer and by the infrared radiation thermometer, detect a measurement abnormality on the basis of a difference between these measured temperatures, and judge, when the measurement abnormality is detected, whether a defect exists in a functional part or the objective lens of the infrared radiation thermometer or the thermoelectric thermometer on the basis of the contamination of the objective lens and a relation between the temperatures measured by the thermoelectric thermometer and by the infrared radiation thermometer.

3. A measurement abnormality detection method for an infrared radiation thermometer for measuring a casting mold comprising:
   preparing a dummy lens placed around an objective lens of the thermometer and arranged close to the objective lens and above the mold, so as to be more susceptible to adherence of contaminants emitted from the mold and thus to more contamination than the objective lens, a laser displacement meter, and a determination device connected to the laser displacement meter;
   projecting light to the dummy lens at predetermined intervals or at a predetermined timing, receiving a light reflected by the dummy lens, and measuring a received light quantity with the laser displacement meter; and
   calculating an attenuation rate of the projected light on the basis of the measured received light quantity, estimating a degree of contamination of the dummy lens on the basis of the calculated attenuation rate, and judging a necessity of warning for contamination of the objective lens on the basis of the degree of contamination of the dummy lens with the determination device,
   wherein the dummy lens and laser displacement meter are constructed independently from the objective lens.

4. The measurement abnormality detection method according to claim 3, further comprising:
   preparing a thermoelectric thermometer for measuring temperature of a dummy black body point set in or near the mold as a part having a shape absorbing infrared radiation or a part most close in shape characteristics to a black body in the mold; and
   obtaining temperatures of the dummy black body point measured by the thermoelectric thermometer and by the infrared radiation thermometer, detecting a measurement abnormality on the basis of a difference between these measured temperatures, and judging, when the measurement abnormality is detected, whether a defect exists in a functional part or the objective lens of the infrared radiation thermometer or the thermoelectric thermometer on the basis of the contamination of the objective lens and a relation between the temperatures measured by the thermoelectric thermometer and by the infrared radiation thermometer.

* * * * *